United States Patent
Hayner

(10) Patent No.: US 11,732,108 B1
(45) Date of Patent: Aug. 22, 2023

(54) MODIFIED ASPHALT COMPOSITIONS CONTAINING DIALKYL POLYSULFIDES

(71) Applicant: Associated Asphalt Partners, LLC, Roanoke, VA (US)

(72) Inventor: Roger E. Hayner, Hebron, KY (US)

(73) Assignee: Associated Asphalt Partners, LLC, Roanoke, VA (US)

( * ) Notice: Subject to any disclaimer, the term of this patent is extended or adjusted under 35 U.S.C. 154(b) by 471 days.

(21) Appl. No.: 16/920,151

(22) Filed: Jul. 2, 2020

Related U.S. Application Data

(60) Provisional application No. 62/870,275, filed on Jul. 3, 2019.

(51) Int. Cl.
  *C08K 5/372* (2006.01)
  *C08J 3/24* (2006.01)

(52) U.S. Cl.
  CPC .............. *C08K 5/372* (2013.01); *C08J 3/246* (2013.01); *C08J 2395/00* (2013.01); *C08J 2409/06* (2013.01)

(58) Field of Classification Search
  CPC .................................. C08K 5/372; C08J 3/246
  USPC ........................................................ 524/81
  See application file for complete search history.

(56) References Cited

U.S. PATENT DOCUMENTS

| | | |
|---|---|---|
| 123,458 A | 2/1872 | Crawford |
| 1,163,593 A | 12/1915 | Forrest |
| 1,266,261 A | 5/1918 | Henderson |
| 1,353,003 A | 9/1920 | White et al. |
| 2,527,948 A | 10/1950 | Lyon et al. |
| 2,673,815 A | 3/1954 | Bartleson |
| 3,238,173 A | 3/1966 | Bailey et al. |
| 3,738,853 A | 6/1973 | Kopvillem et al. |
| 3,951,781 A | 4/1976 | Owen et al. |
| 3,968,023 A | 7/1976 | Yan |
| 3,970,468 A | 7/1976 | Garrigues et al. |
| 3,972,807 A | 8/1976 | Uitti et al. |
| 3,975,396 A | 8/1976 | Bushnell et al. |
| 3,981,797 A | 9/1976 | Kellar et al. |
| 3,998,726 A | 12/1976 | Bunas et al. |
| 4,001,580 A | 1/1977 | Mehrbrodt et al. |
| 4,017,383 A | 4/1977 | Beavon |
| 4,054,512 A | 10/1977 | Dugan et al. |
| 4,101,415 A | 7/1978 | Crowley |
| 4,125,458 A | 11/1978 | Bushnell et al. |
| 4,145,322 A | 3/1979 | Maldonado et al. |
| 4,154,619 A | 5/1979 | Pronk |
| 4,154,710 A | 5/1979 | Maldonado et al. |
| 4,162,999 A | 7/1979 | Bohemen |
| 4,211,575 A | 7/1980 | Burris |
| 4,237,052 A | 12/1980 | Fitoussi et al. |
| 4,242,246 A | 12/1980 | Maldonado et al. |
| 4,283,230 A | 8/1981 | Clementoni et al. |
| 4,298,397 A | 11/1981 | Burris |
| 4,330,449 A | 5/1982 | Maldonado et al. |
| 4,554,313 A * | 11/1985 | Hagenbach ............. C08L 95/00 524/68 |
| 4,585,816 A | 4/1986 | Vitkuske et al. |
| 4,750,984 A | 6/1988 | Ott |
| 5,023,282 A | 6/1991 | Neubert |
| 5,039,342 A | 8/1991 | Jelling |
| 5,118,733 A | 6/1992 | Gelles et al. |
| 5,120,777 A | 6/1992 | Chaverot et al. |
| 5,322,867 A | 6/1994 | Kluttz |
| 5,371,121 A | 12/1994 | Bellomy et al. |
| 5,374,672 A | 12/1994 | Chaverot et al. |
| 5,451,619 A | 9/1995 | Kluttz et al. |
| H1580 H | 8/1996 | Kluttz |
| 5,601,697 A | 2/1997 | Miller et al. |
| 5,718,752 A | 2/1998 | Kluttz |
| 5,904,760 A | 5/1999 | Hayner |
| 6,120,913 A | 9/2000 | Kluttz et al. |
| 7,135,515 B2 | 11/2006 | Früh et al. |
| 7,576,148 B2 | 8/2009 | Kluttz et al. |
| 7,622,519 B2 | 11/2009 | Kluttz et al. |
| 7,728,074 B2 | 6/2010 | Kluttz et al. |
| 7,951,238 B2 | 5/2011 | Deneuvillers et al. |
| 9,115,295 B2 | 8/2015 | Deneuvillers et al. |
| 9,115,296 B2 | 8/2015 | Kluttz et al. |
| 9,695,317 B2 | 7/2017 | Corun |
| 10,066,106 B2 | 9/2018 | Corun |
| 10,570,238 B2 | 2/2020 | Cochran et al. |
| 10,633,485 B2 | 4/2020 | Cochran et al. |
| 2018/0362724 A1 * | 12/2018 | Klein ...................... C08L 95/00 |

FOREIGN PATENT DOCUMENTS

| | | | |
|---|---|---|---|
| CA | 764861 | 8/1967 | |
| WO | WO-2017032661 A1 * | 3/2017 | ............. C08J 11/28 |

OTHER PUBLICATIONS

Kluttz. U.S. Statutory Registration No. H1580. "Asphalt Composition Containing Highly Coupled Radial Polymers." (1996).

* cited by examiner

*Primary Examiner* — Deve V Hall

(74) *Attorney, Agent, or Firm* — Daniel A. Blasiole; DeWitt LLP

(57) ABSTRACT

Modified asphalt compositions and methods of making same. The modified asphalt compositions include asphalt, a crosslinkable polymer, and a dialkyl polysulfide. The methods of making the compositions include blending a mixture of asphalt, a crosslinking polymer, and a dialkyl polysulfide, such as at a temperature of about 100-300° C.

19 Claims, No Drawings

MODIFIED ASPHALT COMPOSITIONS CONTAINING DIALKYL POLYSULFIDES

CROSS-REFERENCE TO RELATED APPLICATIONS

Priority is hereby claimed to provisional application Ser. No. 62/870,275, filed Jul. 3, 2019, which is incorporated herein by reference.

FIELD OF THE INVENTION

The invention is directed to asphalt compositions containing dialkyl polysulfides and methods for preparing same.

BACKGROUND

Sulfur has been used as a modifier for asphalt, by itself or in combination with various polymers, for improving stiffness or elastomeric properties. A somewhat similar approach has been forming a "mother liquor," or blend of sulfur, oil, and polymer, and adding this to the asphalt and then mixing.

Various methods of modifying asphalt, including by adding elemental sulfur, are described in the following references: U.S. Pat. No. 123,458 to Crawford; U.S. Pat. No. 1,163,593 to Forrest; U.S. Pat. No. 1,266,261 to Henderson; U.S. Pat. No. 1,353,003 to White, et al.; U.S. Pat. No. 2,673,815 to Bartleson; U.S. Pat. No. 3,738,853 to Kopvillem; U.S. Pat. No. 3,970, 468 to Garrigues, et al.; U.S. Pat. No. 4,154,619 to Pronk; U.S. Pat. No. 4,211,575 to Burris; U.S. Pat. No. 4,283,230 to Clementoni et al.; U.S. Pat. No. 4,298,397 to Burris; U.S. Pat. No. 4,750,984 to Ott; U.S. Pat. No. 5,374,672 to Chaverot et al.; Canadian Patent No. 764,861 to Pethrick et al.; U.S. Pat. No. 4,330,449 to Maldonado et al.; and U.S. Pat. No. 5,371,121 to Bellomy, et al.

The prior art has generally added large amounts of sulfur (greater than 1 wt. %) to make non-polymerized asphalts resistant to rutting. However, the addition of such amounts of sulfur can impart undesired brittleness resulting in premature failure of the asphalt in its use, e.g., as road surfaces. Higher levels of modification with sulfur also leave the roadway with an undesirable sulfur odor which can remain for extended periods of time and is objectionable to residents and users. When recycling asphalt pavements prepared with higher levels of sulfur in asphalt, there is potential for hydrogen sulfide ($H_2S$) generation from the high temperatures generated during the milling process and from subsequent exposure to the high heat employed within the hot mix plant manufacturing. This potentially eliminates these mixes from use and the conventional recycling processes used today. Some work has been completed adding low amounts of sulfur to asphalt and with various asphalt and polymer compositions.

The conventional methods of adding elemental sulfur (dumping loose powder or bags of powdered elemental sulfur on top of molten asphalt in a mix tank) has problems. Of significant concern is safety. There exists the potential for fire and explosion hazards, caused by having a potentially large cloud of hot and flammable sulfur dust and hydrogen sulfide gas. Sulfur dust is also an irritant and hazardous to employees. Adding molten sulfur and mixing the liquid sulfur with liquid asphalt with and without various polymers has also been conducted. This method continues to have its inherent problems as sulfur, if not kept hot enough, solidifies, and plugs injection lines making handling difficult and control of quality inconsistent. If overheated, it also solidifies and plugs up injection lines and fouls tankage. Sulfur slurries of sulfur flower in oils, with or without various other additives, also continue to present stability problems of the slurry mixture and inconsistencies with uniform sulfur content as they are injected, resulting in localized gelling and quality fluctuations of finished product batches. Regardless, when adding conventional sulfur, the handling issues, reaction times with various polymers, and uniformity and consistency of the reacted products are all current problems within the art.

U.S. Pat. No. 5,904,760 to Hayner et al. discloses a simple and safe way to add elemental sulfur to an asphalt fraction, namely forming a slurry of elemental sulfur in a suitable hydrocarbon oil and then adding this slurry to the asphalt. This eliminates the hazardous addition of powdered sulfur, and permitted rapid, uniform, and efficient mixing of the sulfur/oil slurry with the asphalt. The process avoids the formation of globules of (vulcanized) asphalt within the mixture so long as the sulfur and oil slurry remain mixed and not allowed to settle. However, whenever agitation is removed for a period of time or the sulfur component is not at a high enough content to sterically hinder settling, the composition allows the sulfur to settle. This results in inconsistent concentrations to develop within the dispersion, which results in uneven addition of sulfur to the mixture. This results in areas of inconsistent and over-vulcanization when the higher concentrations of sulfur contact the asphalt polymer mixture. Over vulcanization creates insoluble globules and particles of polymer throughout the asphalt mixture. This results in plugging of pumps, meters, and lines, contributing further to the inconsistent and incomplete incorporation of the sulfur into the polymer-modified asphalt.

Alternatives to modifying asphalt with elemental sulfur but which provide many of the same benefits are needed.

SUMMARY OF THE INVENTION

The present invention provides compositions comprising a dialkyl polysulfide and methods of preparing the same. The compositions have greatly reduced cure times, improved polymer modification efficiency, and reduced polymer consumption due to the heat-reactive dialkyl polysulfide. The compositions are useful for incorporation into asphalt pavement mixes, surface treatments, emulsions, cutbacks, cements, roofing, waterproofing, and sealants.

Compositions of the invention include modified asphalt compositions. Preferred modified asphalt compositions comprise asphalt, a crosslinkable polymer, and a dialkyl polysulfide.

Exemplary suitable asphalts include asphalt from vacuum bottoms resulting from a conventional refining process or solvent-deasphalted bottoms.

Exemplary suitable crosslinkable polymers include diblock styrene butadiene (SB) polymers; triblock styrene butadiene styrene (SBS) polymers; hydrogenated versions of SB and/or SBS, including styrene-ethylene/butylene-styrene (SEBS); styrene isoprene styrene (SIS) triblock copolymers; and SB, SBS, SEBS, and SIS polymers containing vinyl functional groups in addition to styrene, polybutadiene, and isoprene;.

Exemplary suitable dialkyl polysulfides include di-tertiary dodecyl pentasulfide and other dialkyl polysulfides described herein.

The dialkyl polysulfide is preferably an additive that is not originally present in the asphalt component itself.

The compositions can optionally further include a fluxing agent. Exemplary suitable fluxing agent include lube oil, lube oil bottoms, lube plant extract, vacuum tower bottoms (VTBs), gas oils (GO), vacuum gas oils (VGO), heavy vacuum gas oils (HVGO), natural and vegetable-based oils or esters thereof, epoxidized vegetable oils, epoxidized methyl soyates, and re-refined lube oils and re-refined lube oil bottoms.

The modified asphalt compositions can be combined with additional components for uses in a variety of applications, particularly paving asphalts, and to roofing, waterproofing, and industrial applications.

Methods of the invention include methods of making a modified asphalt composition. The methods of making a modified asphalt composition preferably comprise blending a mixture asphalt, a crosslinking polymer, and dialkyl polysulfide. The mixture is preferably blended at a temperature of about 100-300° C.

The methods of the invention improve the rheological properties of polymer-modified asphalt and provide other improvements.

The objects and advantages of the invention will appear more fully from the following detailed description of the preferred embodiment of the invention made in conjunction with the accompanying drawings.

DETAILED DESCRIPTION OF THE INVENTION

Asphalt

The modified asphalt compositions of the invention preferably include asphalt. Most modern road building asphalts are made by distillation of petroleum crude oils, usually under vacuum distillation. The asphalt fraction or "bottom of the barrel" is the residual component left after everything readily distillable has been removed.

Asphalt occurs naturally in both asphalt lakes and in rock asphalt (a mixture of sand, limestone, and asphalt) or is a refined product produced from the distillation and further processing of petroleum crude oil. The term "asphalt" (sometimes referred to as "bitumen") refers to all types of asphalts (bitumen), including those that occur in nature, i.e. Trinidad Lake Asphalt, Gilsonite, or Rock Asphalt, and those obtained from various methods of crude petroleum processing. Asphalt may also include materials derived from shale oil, synthetic petroleum derived from coal or other hydrocarbon liquids, vegetable-based oils, pitches, and modifications thereof or any number of combinations and blends thereof.

Asphalt and the many compositions thereof have evolved through multiple specifications. These include Penetration Grading whereas technologists believed the quality of the binder and its ability to perform was proportional to the softness or hardness when measured by a needle penetration apparatus. Viscosity Graded binders soon followed in which the viscosity of the material was chosen as an improved measure to predict binder performance in various temperatures or loading situations. Today, paving asphalt quality is quantified by a binder's ability to perform as it ages. The asphalt is subject to both climatic and loading conditions, and measured using a set of Performance Graded specifications known as "PG" tests.

Industrial and roofing asphalts have progressed similarly through various modifications and specification changes over the years. Like paving grade asphalt, roofing and waterproofing materials have been subject to a broad spectrum of modification with various processing and chemical treatments, additives, polymers, biobased and petroleum refined oils, as well as many different modifications thereof as well as many different commonly known fluxing agents, re-refined oils, and re-refined oil bottoms and various fractions obtained from the re-refining process of used and waste oil streams.

Asphalt can be made through solvent deasphalting. Such asphalts are generally of a lower quality but may be used as a blending stock with other refined petroleum or naturally derived asphalts, oils, fluxing agents, bio-based oils, polymers and polymerized materials, and variations thereof with materials obtained by distillation. Solvent deasphalting, SDA, is described in U.S. Pat. No. 3,951,781 to Owen (Mobil); U.S. Pat. No. 3,968,023 to Yan (Mobil); U.S. Pat. No. 3,972,807 to Uitti (UOP); U.S. Pat. No. 3,975,396 to Bushnell (Exxon); U.S. Pat. No. 3,981,797 to Kellar (UOP); U.S. Pat. No. 3,998,726 to Bunas (UOP); U.S. Pat. No. 4,017,383 to Beavon (Ralph M. Parsons); U.S. Pat. No. 4,054,512 to Dugan (Exxon); U.S. Pat. No. 4,101,415 to Crowley (Phillips); U.S. Pat. No. 4,125,458 to Bushnell (Exxon); and numerous others. Specific proprietary processes include the SOLVAHL solvent deasphalting process licensed by Institute Francais de Petrole, and the low-energy deasphalting process licensed by Foster Wheeler, U.S.A.

Deasphalting processes also include the ROSE supercritical fluid technology licensed by Kerr-McGee Corporation. U.S. Pat. No. 4,283,230 to Clementoni, et al. (Exxon) teaches improving the properties of propane-precipitated asphalt by air blowing (and adding 5-60 wt. % sulfur-treated petroleum) to make paving grade asphalt.

U.S. Pat. No. 5,601,697 to Miller, et al. teaches SDA-produced asphalts (containing solvent deasphalting bottoms) made by blending SDA bottoms with aromatic extract. Asphalts produced or containing solvent extracted or deasphalted bottoms may be suitable for use in either paving or industrial applications.

Suitable asphalt or bitumens for use in the present invention include a variety of organic materials, are solid or semi-solid at room temperature, and gradually liquefy when heated. Asphalts and bitumen can be obtained from petroleum refining, synthetic petroleum, or shale oil refining, used or waste oil re-refining, or from coal tar or the like. The choice will depend essentially on the particular application intended for the resulting bitumen composition. Preferred materials are those meeting the requirements of AASHTO M 226—Standard Specification for Viscosity-Graded Asphalt Cement, which have an initial viscosity at 140° F. (60° C.) of 50 to 10,000 poise, preferably 100-5,000 poise.

When the intended use of the modified asphalt composition of the invention is road paving, roofing, waterproofing, sealants or industrial applications, the preferred initial penetration range of the asphalt at 77° F. (25° C.) is 0 dmm to 500 dmm, preferably 100 to 350 dmm, and most preferably between 10 dmm and 160 dmm as outlined in AASHTO M-20 Standard Specification for Penetration-Graded Asphalt Cement. Additional suitable asphalts can be those selected whose characteristics meet the requirements of AASHTO M-320, Standard Specification for Performance-Graded Asphalt Binder or AASHTO M 332, Standard Specification for Performance-Graded Asphalt Binder Using Multiple Stress Creep Recovery (MSCR). Asphalts that do not contain any polymer, sulfur, etc., may sometimes be referred to herein as a "base asphalt."

Solvent deasphalting or distillation may be used to produce the asphalt. Solvent extracted (ROSE) and or solvent deasphalting (SDA) bottoms or "Hard Pen" materials may be also used as part or all of the asphalt of the modified asphalt composition of the invention. SDA bottoms are obtained from suitable feeds such as vacuum tower bottoms, reduced crude (atmospheric), topped crude, and preferably hydrocarbons comprising an initial boiling point of about 450° C. (850° F.) or above. Preferably, the solvent deasphalting bottoms are obtained from vacuum tower bottoms, preferably boiling above 538° C. (1000° F.). Solvent deasphalting can be carried out at temperatures of 93-148° C. (200-300° F.). After solvent deasphalting, the resulting SDA bottoms typically have a boiling point above 510° C. (950° F.), preferably above 540° C. (1000° F.), and a penetration of 0 to 70 dmm @25° C. (77° F.), preferably 0 to 50 dmm @ 25° C. (770 F.).

The asphalt may be solely or partly material produced by distillation, without any solvent extraction step. Such materials, sometimes referred to as "asphalt cement", have a reduced viscosity relative to SDA bottoms. The asphalt cement component can have a viscosity of 50 to 5000 poises at 60° C. (140° F.), preferably 100 to 4000 poises, e.g., 500 poises for PG52-28 asphalt cement. Performance Graded (PG) Applications, the asphalt cements may have a G*/sin delta value in excess of 1.0 kPa at temperatures ranging from 46 to 82° C., preferably 52 to 76° C.

Naturally occurring asphaltic materials may also be used as the asphalt in the present invention. These include Trinidad Lake Asphalt and Gilsonite. Residuum prepared from the distillation and refining of shale oils may also be used.

The asphalt can be included in the modified asphalt composition of the invention in amounts sufficient to provide the modified asphalt composition with the desired viscosity for the intended application. For PG64-22 used in typical paving applications, such a viscosity is about 2000 poises at 60° C. (140° F.).

The asphalt is preferably included in the modified asphalt composition of the invention in amounts of about 1-99 wt. %, such as about 5-95 wt. %, more preferably about 5-85 wt. %, more preferably about 20-90 wt. %, and most preferably about 30-95 wt. % of the modified asphalt composition.

Polymer Modifiers

The modified asphalt compositions of the invention preferably include a crosslinkable polymer. While the invention is not to be limited to any theory, crosslinkable polymers apparently cause polymerization with the natural or synthetic asphalts of the invention.

The crosslinkable polymers of the invention can comprise alkene monomers. Alkene monomers include one or more alkene (carbon-carbon double bond, C=C) groups. Preferred alkene monomers include at least two alkene groups. Examples of alkene monomers include butadiene monomers, isoprene monomers, ethene monomers, and propene monomers. The crosslinkable polymers of the invention can comprise styrene monomers. The crosslinkable polymers of the invention can include homopolymers and/or copolymers. The general terms "crosslinkable polymers" and "alkene monomers" can refer to the polymers and monomers, respectively, in their non-crosslinked states, their crosslinked states, or both.

Suitable exemplary crosslinkable polymers include, styrene-butadiene (SB) diblocks, styrene-isoprene-styrene (SIS) triblocks, and styrene-butadiene-styrene (SBS) triblocks, such as those taught in U.S. Pat. No. 3,238,173 to Bailey (Shell); U.S. Pat. No. 4,145,322 to Maldonado et al. (Elf) (block copolymer with an average molecular weight between 30,000 and 300,000 having the theoretical formula $S^x$-$B^y$ in which S corresponds to styrene structure groups, and B corresponds to conjugated diene structure groups and x and y are integers); U.S. Pat. No. 4,154,710 to Maldonado et al. (Elf) (thermoplastic elastomer having a molecular weight between 100,000 and 2,000,000, e.g. polyisobutenes, styrene-butadiene rubber (SBR), polychloroprene, isobutene-isoprene copolymers, halogenated or non-halogenated, ethylene-propylene-diene terpolymers (EPDM), ethylene-propylene copolymers (EPR), ethylene-cyclopentadiene copolymers, polybutadienes, and polynorbornenes); U.S. Pat. No. 4,162,999 to Bohemen (British Petroleum); U.S. Pat. No. 4,237,052 to Fitoussi et al. (Elf) (dihalopolybutadiene polymer and tri-block copolymer with a linear or cyclic structure of a molecular weight within the range of 100,000 and 300,000); U.S. Pat. No. 4,242,246 to Maldonado (Elf) (polystyrene-polydience disequenced, multisequenced, or statistical copolymer); U.S. Pat. No. 4,330,449 to Maldonado et al. (Elf) (polyblock copolymer of a styrene-carboxylated conjugated diene having a mean molecular weight of 30,000 to 300,000); U.S. Pat. No. 4,554,313 to Hagenbach (Elf (styrene-conjugated diene copolymer); U.S. Pat. No. 4,567,222 to Hagenback (Elf; U.S. Pat. No. 4,585,816 to Vitkuske (Dow Chemical); U.S. Pat. No. 5,023,282 to Neubert (GenCorp); U.S. Pat. No. 5,039,342 to Jelling (National Patent Development); U.S. Pat. No. 5,118,733 to Gelles (Shell); and U.S. Pat. No. 5,120,777 to Chaverot (Elf; (diene/vinyl aromatic block copolymers, e.g. methylstyrene, tertiary butyl styrene, etc.).

Additional suitable crosslinkable polymers include natural latex rubbers, polychloroprene rubbers, and nitrile butadiene rubber. Additional suitable polymers include polyolefin elastomers (POEs).

Additional suitable crosslinkable polymers include vinyl modified block copolymers wherein the vinyl block copolymer composition comprises (i) a diblock copolymer comprising one block of a monovinylaromatic hydrocarbon and one block of a conjugated diene having a peak molecular weight from about 30,000 to about 78,000 and a vinyl content from about 35 to about 80 mol percent based on the number of repeat monomer units in the conjugated diene block, and (ii) optionally one or more block copolymers comprising at least two blocks of monovinylaromatic hydrocarbon and at least one block of conjugated diene, the block copolymer selected from linear triblock copolymers, multiarm coupled block copolymers, and mixtures thereof, the linear triblock copolymers having a peak molecular weight that is 1.5 to 3.0 times the peak molecular weight of the diblock copolymer and multiarm coupled block copolymers having a peak molecular weight that is 1.5 to 9.0 times the peak molecular weight of the diblock copolymer, and each having a vinyl content from about 35 to about 80 mmol percent based on the number of repeat monomer units in the conjugated diene block, wherein when both (i) and (ii) are present, the ratio of (i) to (ii) is greater than 1:1. Additional suitable crosslinkable polymers include block copolymers of the formula S-B1-B2, wherein S is a monovinylaromatic hydrocarbon block having a peak molecular weight from 10,000 to 25,000, B1 is a polybutadiene block having a vinyl content of less than 15 mol percent, B2 is a polybutadiene block having a vinyl content of greater than 25 mol percent, wherein the weight ratio of B1 to B2 is greater than or equal to 1:1, and wherein the S-B1-B2 block copolymer has a peak molecular weight from 40,000 to 200,000; and optionally, one or more block copolymers of the formula $(S-B1-B2)_n^x$ wherein each S is a monovinylaromatic hydrocarbon block having a peak molecular weight from 10,000 to 25,000, each B1 is a polybutadiene block having a vinyl content of less than 15 mol percent, each B2 is a polybutadiene block having a vinyl content of greater than 25 mol percent, n is an integer from 2 to 6, and X is the residue of a coupling agent, wherein the weight ratio of 1 to B2 is greater than or equal to 1:1, and wherein the (S-B1-B2)$^{nX}$ block copolymer has a peak molecular weight that is from 1.5 to 6.0 times the peak molecular weight of the S-B1-B2 block copolymer. In some versions, when both S-1-B2 and (S-1-B2)$^{nX}$ are present in the block copolymer composition, the ratio of S-B1-B2 to (S-B1-B2)$^{nX}$ is greater than 1:1.

Additional suitable crosslinkable polymers include the block copolymers of U.S. Pat. Nos. 7,622,519; 5,322,867; 5,451,619; 4,001,580; 5,718,752; 6,120,913; 7,576,148; 7,728,074; 9,115,296; and U.S. Statutory Registration No. H1580.

Preferred crosslinkable polymers for the modified asphalt compositions of the invention include styrene-butadiene (SB) diblock copolymers or styrene-butadiene styrene (SBS) triblock copolymers.

The crosslinkable polymer is preferably included in the modified asphalt composition of the invention in amounts of about 0.5-20.0 wt. %, more preferably about 1.0-15.0 wt. %, and most preferably about 1.5-10.0 wt. % of the asphalt.

In addition to the crosslinkable polymer, the modified asphalt compositions of the invention can include one or more supplemental polymers. Exemplary supplemental polymers include but are not limited to recycled rubber and recycled ground tire rubber (GTR), asphalt rubber modifiers such as those described un U.S. Pat. No. 10,633,485 B2, Vestenamer® marketed by Evonik, Sasol Wax marketed by Sasol, reactive ethylene terpolymers (ethylene butyl acrylate glycidyl methacrylate copolymer) commonly marketed under the Elvaloy® trademark by DuPont, ethylene butyl acrylate copolymers, and ethylene vinyl acetate (EVA) polymers with varying levels of vinyl modification. The supplemental polymer may also comprise a thermoplastic elastomer produced from polymerization of various plant oils as described as in U.S. Pat. No. 10,570,238 B2. The supplemental polymer, when present, is preferably included in the modified asphalt composition of the invention in amounts of or between about 0.0-20.0 wt. %, more preferably of or between about 0.0-15 wt. % and most preferably of or between about 0.0-10.0% wt. % of the modified asphalt composition.

Dialkyl Polysulfide

The modified asphalt compositions of the invention preferably include a dialkyl polysulfide. Dialkyl polysulfides of the invention include compounds of the following formula:

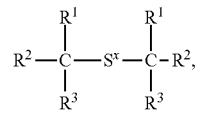

wherein: each instance of $R^1$, $R^2$, and $R^3$ is independently hydrogen or a branched or linear $C^1$-$C^{15}$ alkyl radical; and X is 2-10 or more. It is preferred that at least one instance of le is a branched or linear $C^1$-$C^{15}$ alkyl radical, such as a $C^5$-$C^{15}$ alkyl radical. It is more preferred that at each instance of le is a branched or linear $C^1$-$C^{15}$ alkyl radical, such as a $C^5$-$C^{15}$ alkyl radical. Compounds in which $R^1$, $R^2$, and $R^3$ represent branched or linear $C^{5-}$ to $C^{15}$-alkyl radicals, in particular branched $C^{5-}$ to $C^{15}$-alkyl radicals, are even more preferred. Compounds in which X is 4-12, such as 4-8, such as 5 or 8, are preferred. Dialkyl octasulfides, for example, are generally preferred.

Exemplary dialkyl pentasulfides include branched dioctyl pentasulfide and tertiary dodecyl pentasulfides, any of the dialkyl pentasulfides disclosed in U.S. Pat. No. 7,135,515, the dialkyl polysulfides available as AAXL-IV™ from Associated Asphalt Marketing LLC, Additin® C2540 available from Rhein Chemie, Arkema TPS-32®, dialkyl polysulfides disclosed in U.S. Pat. No. 2,527,948, as well as other commercially available dialkyl pentasulfides of the desired composition.

The dialkyl polysulfides may be employed individually or in any desired combination or mixture with one another.

The dialkyl polysulfides of the current invention typically yield active free sulfur in an amount of from about 10 to about 40 wt. % of the original amount of the dialkyl polysulfide in situ. Active free sulfur is much more reactive and increases in activity as temperature of the mixture increases making them especially suited for preparing high efficiency asphalt polymer compositions. Accordingly, the compositions of the invention can further include degradation products of the dialkyl polysulfide, whether in free form or in a form reacted with other components, such as the crosslinkable polymer.

The dialkyl polysulfide is preferably included in the modified asphalt composition of the invention in amounts of about 0.01-2.0 wt. %, more preferably about 0.01-1.0 wt. %, more preferably about 0.05-0.7 wt. %, and most preferably about 0.07-0.5 wt. % of the modified asphalt composition. Such amounts refer to the amount of dialkyl polysulfide initially added to the composition, and account for the combined mass both the intact dialkyl polysulfide and any degradation products thereof at any given point in time.

The dialkyl polysulfide is preferably added to the other components of the compositions in a solution form. This provides benefits over providing the dialkyl polysulfide in a slurry form, such that the dialkyl polysulfide is capable of being more evenly mixed with the other components during addition without areas of high local concentration. "Solution form" refers herein to a form in which the dialkyl polysulfide is solubilized in a carrier, rather than merely suspended or dispersed in the carrier.

Fluxing Agents

Suitable fluxing components are added to improve the flow properties of the asphalt composition and can improve the penetration for a desired softening point.

Fluxing agents can be obtained from one or many sources. They include but are not limited to petroleum-based materials including soft asphaltic binders, vacuum tower bottoms (VTBs), fuel oils, extracts, gas oils (GO), vacuum gas oils (VGO and HVGO), and aromatic, naphthenic, or paraffinic oils produced in the lubricant refining process. Gas oils can contain both isoparaffins and monoaromatics. Gas oils may also include hydrotreated, hydrocracked, or isodewaxed oils. Fluxing agents may also include natural or vegetable-based oils, fatty acids and various oxidized or esters compositions thereof. Suitable fluxing agents may also include recycled and re-refined oils and lubricants as well as the vacuum residuum of recycled oils from various streams produced from the re-refining process. The primary constraints on the fluxing components are safety and compatibility. The material should be relatively non-volatile, i.e., have initial boiling points above 600° F. The oil should be chosen to provide desired finished product results while minimizing health or safety effects. There is no upper limit, per se, on boiling point, and many suitable oils will have end points in the 1000+° F. range.

Fluxing components can include paraffinic as well as aromatic materials, e.g., gas oils (which can contain both isoparaffins and monoaromatics). Gas oils include neutral oils, including hydrocracked or isodewaxed neutral oils. Suitable paraffinic fluxing components include paraffinic oils having at least 50 wt. % paraffins content (isoparaffins and normal paraffins) such as Footes oil (which is highly paraffinic and obtained from deoiling slack wax), as well as slack wax itself.

Vacuum tower bottoms produced in the refining process conventionally are not suited for asphalt paving by themselves due to their softness and inability to firmly bind stone when used in paving mixtures. They are characterized as having needle penetrations from 100 dmm to >400 dmm at 77° F. and may also be used as fluxing agents.

Footes oil is a refinery produced blendstock particularly suited for use in the present invention. It can be a byproduct in the production of paraffin wax. It may be the first Footes oil fraction obtained from slack wax derived from a medium lubricating oil distilled from a mineral oil.

The Footes oil can be prepared by feeding a waxy petroleum crude oil to a crude still and taking off various cuts including a cut called medium lube distillate, which is the preferred source of the Footes oil used in this invention. The medium lube distillate cut boils primarily in the range of 700° to 1000° F., preferably 800° to 900° F., and has an API specific gravity of 26, e.g., 25.5 to 26.5. This medium lube distillate may advantageously be further refined to improve color stability by solvent extraction using, e.g., phenol or furfural to remove aromatic type compounds. The lube distillate or the raffinate from solvent extraction is further refined by dewaxing, often at relatively low temperatures of, for example, -10° F., using various solvents or mixtures of solvents such as methyl ethyl ketone, benzene, acetone, and toluene to produce, after removal of the solvent, what is called a base lube oil stock and a slack wax. The slack wax is further refined to produce a deoiled slack wax and a Footes oil, for instance, by further solvent extraction, using the same solvents but at higher temperatures, e.g., about 45° F., as in the dewaxing step above or by sweating.

The Footes oil employed in the present invention can be relatively low in aromatic compounds and is composed principally of n-paraffins, isoparaffins and monocyclic naphthenes. More specifically, the composition of the Footes oil used can be about 40-50 wt. % n-paraffins, 5-15 wt. % iso-paraffins, 35-45 wt. % monocyclic naphthenes, and 1-5 wt. % aromatics.

Lube plant extracts may also be used as fluxing agents in the present invention. They can be produced by solvent extraction processes providing a concentrate which is extracted from a suitable heavy petroleum stream, e.g., waxy distillate (WD) which, after dewaxing, produces a wax-free lube oil preferably having a viscosity ranging from 10 to 1000 SUS, preferably 50 to 800 SUS, e.g., 330 SUS at 100° F. (330 extract). Any suitable aprotic solvent extractor may be employed, e.g., sulfolane, furfural, or N-methylpyrrolidone, with furfural being especially preferred. The lube plant extract such as 330 extract can preferably be from a lube oil plant but can be from other extraction steps in hydrocarbon refining processes.

Recycled and re-refined oils and lubricants, both petroleum and natural based may be used as a fluxing agent in the present invention. The vacuum residuum from re-refining of lubricating based waste oils from various streams may also be used as fluxing agents.

Polyalphaolefins (PAOs), various esters, and other synthetic lubricant materials are also suited for use as fluxing components.

Aromatic oils such as those marketed under the brand names Hydrolene, Kendex, Raffene, Raffex, and many others are useful in the present invention as fluxing agents and diluent oils for polymer mixtures.

Natural or vegetable based fluxing agents or diluent oils may be employed as a means to soften asphalt or to enhance flexibility, lower viscosity, increase tackiness, or improve low temperature properties. They may also include natural or vegetable-based oils, fatty acids and various air blown or oxidized oils, epoxidized oils such as soybean or castor, or fatty acid esters and modifications and compositions thereof.

Additional suitable fluxing agents include those provided by U.S. Pat. No. 9,115,295 to Deneuvillers et al. These fluxing agents include at least one compound based on fatty substances of natural origin including hydrocarbon fatty chains. These fatty substances of natural origin have undergone at least one chemical functionalization reaction through which at least one oxygenated functional group has been introduced.

Additional suitable fluxing agents include those provided by U.S. Pat. No. 7,951,238 to Deneuvillers et al. U.S. Pat. No. 7,951,238 to Deneuvillers et al. discloses a method for preparing a fluxing oil, having an iodine number ranging from 50 to 200, based on fatty substances of natural origin having been chemically functionalized by oxidation.

Fluxing agents described herein may be used in the present invention as a recycling agent when the asphalt of the invention is utilized for recycling asphalt mixes containing recycled asphalt pavement (RAP) or recycled asphalt shingles (RAS) or combinations of both.

Table 1 gives the distillation ranges of some examples of petroleum-based fluxing agents suitable for use in the present invention. It is intended as an example of various distillation ranges available and is not a complete listing of all potential fluxing agents.

TABLE 1

| | | | Fluxing agent examples. | | | |
|---|---|---|---|---|---|---|
| Distillation Range | 325 HF Neutral Paraffinic Basestock | 100 HF Neutral Paraffinic Basestock | 325 AROMATIC Oil | Rerefined Lube Oil 180 Neutral | Rerefined Lube Oil HVGO | Rerefined Lube Oil Vacuum Tower Bottoms |
| IBP | 653 | 607 | 647 | 450 | 494 | 474 |
| 1% | 682 | 629 | 670 | 554 | 564 | 577 |
| 5% | 749 | 668 | 737 | 690 | 667 | 718 |

TABLE 1-continued

Fluxing agent examples.

| Distillation Range | 325 HF Neutral Paraffinic Basestock | 100 HF Neutral Paraffinic Basestock | 325 AROMATIC Oil | Rerefined Lube Oil 180 Neutral | Rerefined Lube Oil HVGO | Rerefined Lube Oil Vacuum Tower Bottoms |
|---|---|---|---|---|---|---|
| 10% | 782 | 687 | 771 | 724 | 698 | 757 |
| 15% | 802 | 700 | 792 | 744 | 716 | 783 |
| 20% | 817 | 710 | 807 | 760 | 730 | 803 |
| 25% | 829 | 721 | 819 | 774 | 743 | 820 |
| 30% | 840 | 730 | 830 | 786 | 755 | 836 |
| 35% | 850 | 739 | 840 | 797 | 766 | 851 |
| 40% | 859 | 748 | 850 | 808 | 776 | 864 |
| 45% | 868 | 757 | 859 | 818 | 787 | 878 |
| 50% | 877 | 766 | 868 | 829 | 797 | 891 |
| 55% | 885 | 776 | 877 | 840 | 807 | 904 |
| 60% | 894 | 785 | 886 | 851 | 818 | 917 |
| 65% | 902 | 796 | 895 | 862 | 829 | 930 |
| 70% | 911 | 807 | 905 | 875 | 842 | 943 |
| 75% | 921 | 819 | 915 | 888 | 855 | 958 |
| 80% | 931 | 833 | 925 | 901 | 871 | 974 |
| 85% | 942 | 850 | 937 | 916 | 889 | 990 |
| 90% | 955 | 873 | 952 | 934 | 912 | 1015 |
| 95% | 974 | 907 | 973 | 959 | 946 | 1063 |
| FBP | 1028 | 986 | 1033 | 1015 | 1030 | 1151 |

The fluxing agent is preferably included in the modified asphalt composition of the invention in amounts of or between about 0-80 wt. %, more preferably of or between about 0-50 wt. %, and most preferably of or between about 0-30 wt. % of the modified asphalt composition.

Other Additives

Other additives that may be included in the modified asphalt composition of the invention include waxes, functionalized waxes, amides, microcrystalline wax, paraffin waxes, slack wax, fischer tropsch waxes, and naturally occurring waxes.

Fatty amine derivatives and/or high acetate content ethyl vinyl acetate may be included in the modified asphalt composition of the invention to improve the flowability and workability of a bituminous asphalt mix. See, e.g., U.S. Pat. No. 9,695,317 B2 to Corun and U.S. Pat. No. 10,066,106 B2 to Corun.

Various fillers may be added to the modified asphalt composition of the invention for use as sealants, crackfillers, waterproofing, roofing compositions, and various other applications. These fillers include talcs, calcium carbonates, micas, fibers (both synthetic and natural), fumed silicas, carbon black, fly ash, and clays such as sepiolite, attapulgite, montmorillonite, and various others. The filler is preferably included in the modified asphalt composition of the invention in amounts of or between about 0-50 wt. %, more preferably of or between about 0-40 wt. %, and most preferably of or between about 10-35 wt. % of the modified asphalt composition.

Various solvents may be used for cutbacks of the present invention including raffinate, gasolines, naphtha, mineral spirits, diesel fuel, esters of fatty acids, are some of the many that can be employed. It is understood that many others are known to those skilled in the art and are intended to be incorporated herein.

Additives may include various amine and phosphate based anti-strips, emulsifiers selected from anionic, cationic, and non-ionic types for producing emulsions, warm mix additives such as Evotherm and other amine and wax based additives. Mineral acids may also be added to modify the stiffness and asphaltene fractions of the present invention. PPA (polyphosphoric acid) may be used.

Blending

The modified asphalt composition of the invention can be made by blending the asphalt, crosslinking polymer, the dialkyl polysulfide, and, optionally, any additional components described herein at a temperature of about 100-300° C. (about 220-572° F.), and more preferably about 110-250° C. (about 230-482° F.). The dialkyl polysulfide is preferably injected at a controlled injection rate to the asphalt crosslinking polymer, and optionally, any of the additional components described herein to allow for complete and uniform dispersion within the mixture. Once the dialkyl polysulfide is added to the other components, the resulting mixture is mixed from about 5 to 10 hours, preferably about 1.0 to 6.0 hours, e.g., about 2.0 to 4.0 hours. In practice, suitable blending of the asphalt and the dialkyl polysulfide will usually occur at a temperature above the melting point of the asphalt mixture, typically in the range of about 300-385° F.

High-shear mixing is an exemplary blending method. This can be performed using a blending system equipped with adequate mixing and circulation capabilities through a high shear colloid mill, operating for 10 to 240 minutes at a temperature of 200 to 400° F. Other conventional mixing techniques may be used. These may employ the use of mixing blades or impellers to stir a tank of the material under low shear. Mixing may also be performed with conventional pumps to transfer mix the material from one vessel to another, use of static mixers, and the like.

In some versions, concentrates can first be generated and diluted so that the concentrations of the components fall within the preferred concentrations described herein.

Oxidizing Conditions:

The pre-mixed asphalt or the mixed modified asphalt may optionally be oxidized.

Prior to oxidizing, the asphalt component can be preheated to temperatures ranging from 20 to 180° C., preferably 50 to 165° C., and may be held at such temperatures from 0.1 to 24 hours, preferably from 1 to 10 hours. The preheating step can be carried out under mixing conditions to effect more even heat transfer.

Oxidizing can be used to prepare pre-mixed asphalt or the mixed modified asphalt to a desired softening point and penetration specification by exposing the asphalt cement to oxidizing agents such as oxygen, air, or oxidizing agents such as peroxides, etc. Preferably, such oxidizing is carried out by heating the mixed asphalt cement to temperatures ranging from 100 to 400° C. (212 to 752° F.), preferably 150 to 260° C. (300 to 500° F.), and forcing oxygen-containing gas, e.g., air through the blend with or without the presence of a catalyst. While not critical to the oxidation process, such catalysts as napthenic acids, sodium sequicarbonate, phosphoric acid, polyphosphoric acid or ferric chloride, common to those skilled in the art, may be employed. The oxidizing step can be conducted using air flow rates of 1 to 10 standard cubic feet per hour (SCFH), preferably 2 to 5 SCFH for 1 to 50 hours, more preferably 2 to 5 hours. Oxidizing may be carried out until a desired change in viscosity of less than 500 poises per hour measured @ 140° C., preferably less than 400 poises per hour, and in certain embodiments, less than about 100 poise per hour.

General

The percentages expressed herein refer to wt. % unless the context indicates otherwise.

The elements and method steps described herein can be used in any combination whether explicitly described or not.

All combinations of method steps as used herein can be performed in any order, unless otherwise specified or clearly implied to the contrary by the context in which the referenced combination is made.

As used herein, the singular forms "a," "an," and "the" include plural referents unless the content clearly dictates otherwise.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All patents, patent publications, and peer-reviewed publications (i.e., "references") cited herein are expressly incorporated by reference to the same extent as if each individual reference were specifically and individually indicated as being incorporated by reference. In case of conflict between the present disclosure and the incorporated references, the present disclosure controls.

It is understood that the invention is not confined to the particular construction and arrangement of parts herein illustrated and described, but embraces such modified forms thereof as come within the scope of the claims.

EXAMPLES

Example 1: P50617-A (Comparative)

Into a heated container equipped with a Silverson high shear mixing device is charged 95.5 parts of a PG70-22 asphalt cement and agitation started and heated to 375° F. Slowly added is 4.5 parts of a vinyl modified SBS copolymer commercially sold as Kraton D243 and allowed to pre-wet at a temperature of 375° F. for a period of 45 minutes. Circulation is initiated through the Silverson high shear mixer until SBS polymer is completely melted and dispersed during the 45-minute period, becoming smooth and uniformly distributed into the asphalt phase. Dispersed polymer blend is then transferred into a separate storage container and placed in a controlled temperature oven equipped with continuous mixing and held under mild agitation at 350° F. for curing. Full curing took approximately 6 days or 144 hours. Material was sampled and tested for conformance to Performance Graded asphalt specifications and found to have an original binder DSR (dynamic shear rheometer testing) G*/sin δ result of 1.56 KPa at 82° C. measuring as a true grade of 86.6° C. MSCR results at 76° C. was 0.92 with a recovery of 24.75%. Brookfield rotational viscosity measured at 135° C. was found to be 1.938 PA-s. Significant to this example is the use of a vinyl modified block copolymer conventionally sold as self-crosslinking yet it took 6 days (144 hours) to fully cure and meet specification targets for the polymer modified asphalt formulation.

Example 2: P50617-B (Comparative)

Into a heated container equipped with a Silverson high shear mixing device is charged 95.0 parts of a PG70-22 asphalt cement and agitation started and heated to 375° F. Slowly added is 4.5 parts of a vinyl modified SBS copolymer commercially sold as Kraton D243 and allowed to pre-wet at a temperature of 375° F. for a period of 45 minutes. Circulation is initiated through the Silverson high shear mixer until SBS polymer is completely melted and dispersed during the 45-minute period, becoming smooth and uniformly distributed into the asphalt phase. Dispersed polymer blend is then transferred into a separate storage container and placed in a controlled temperature oven equipped with continuous mixing and held under mild agitation at 350° F. for curing. Full curing took approximately 6 days or 144 hours. Material was sampled and tested for conformance to Performance Graded asphalt specifications and found to have an original binder DSR (dynamic shear rheometer testing) G*/sin δ result of 2.16 KPa at 82° C. measuring a rue grade of 82.0° C. MSCR results at 76° C. was 0.51 with a recovery of 52.7%. Brookfield rotational viscosity measured at 135° C. was found to be 2.820 PA-s. Significant to this example is the use of a vinyl modified block copolymer conventionally sold as self-crosslinking yet it took 6 days (144 hours) to fully cure and meet specification targets for the polymer modified asphalt formulation.

Example 3: P50617-C (Invention)

Into a heated container equipped with a Silverson high shear mixing device is charged 95.5 parts of asphalt cement and agitation started and heated to 375° F. Slowly added is 4.5 parts of a vinyl modified SBS copolymer commercially sold as Kraton D243 and allowed to pre-wet at a temperature of 375° F. for a period of 45 minutes. Circulation is initiated through the Silverson high shear mixer until SBS polymer is completely melted and dispersed during the 45-minute period, becoming smooth and uniformly distributed into the asphalt phase. To this mixture is added 0.09 parts of a dialkyl pentasulfide heat activated metalworking lubricant additive having active sulfur present in the range of 30-40% wt. The dispersed polymer, asphalt, and dialkyl pentasulfide blend is then transferred into a separate storage container and placed in a controlled temperature oven equipped with continuous mixing and held under mild agitation at 350° F. for curing. Full curing was drastically reduced having only taken approximately 1 hours to meet specification requirements. Material met original binder DSR (dynamic shear rheometer testing) G*/sin δ result of 1.09 KPa at 82° C. measuring a true grade of 93.0° C. Brookfield rotational viscosity measured at 135° C. was found to be 1.825 PA-s. Significant to this example is the use of a vinyl modified block copolymer conventionally sold as self-crosslinking which took 6 days to fully cure as illustrated in example 1 yet when treated with the heat activated dialkyl pentasulfide, curing times were reduced to 1.0 hour to meet specification targets for the polymer modified asphalt formulation.

Example 4: P50617-C (Invention)

Into a heated container equipped with a Silverson high shear mixing device is charged 95.5 parts of asphalt cement and agitation started and heated to 375° F. Slowly added is 4.5 parts of a vinyl modified SBS copolymer commercially sold as Kraton D243 and allowed to pre-wet at a temperature of 375° F. for a period of 45 minutes. Circulation is initiated through the Silverson high shear mixer until SBS polymer is completely melted and dispersed during the 45-minute period, becoming smooth and uniformly distributed into the asphalt phase. To this mixture is added 0.09 parts of a dialkyl pentasulfide heat activated metalworking lubricant additive having active sulfur present in the range of 30-40% wt. The dispersed polymer, asphalt, and dialkyl pentasulfide blend is then transferred into a separate storage container and placed in a controlled temperature oven equipped with continuous mixing and held under mild agitation at 350° F. for curing. Full curing was drastically reduced, and the composition met specifications as described in Example 3 above, but curing was allowed to continue for 48 hours to determine the extent of improvement in specification compliance. After ⅓ the amount of the 144 hours cure time required in mixtures of Examples 1 and 2, the material had improved in original binder DSR result of 4.77 at 82° C. measuring a true grade of 93.0° C. This was greater than 2× the 2.16 KPa measured after 144 hours cure. Brookfield rotational viscosity measured at 135° C. was found to be 4.563 PA-s. Significant to this example is the use of a vinyl modified block copolymer conventionally sold as self-crosslinking which took 6 days to fully cure as illustrated in example 1 yet when treated with the heat activated dialkyl pentasulfide, curing times were reduced to 1.0 hour to meet specification targets for the polymer modified asphalt formulation. After ⅓ of the 144 hours cure of comparative examples 1 and 2, composition of example 3 after only 48 hours far surpassed their performance grading results.

Example 5: P50617-D (Invention)

Example 5 provides another example of the invention whereas the polymer content contained in Example 3 and 4 is increased from 4.5 to 5.0 parts, while keeping the dialkyl pentasulfide at 0.09 parts and the asphalt portion at 94.91 parts. After only 1-hour cure, Dynamic Shear Rheometer (DSR) testing met requirements for G*/sin δ, measuring 1.3 KPa@82° C. Trugrade was at 84.9° C., and Brookfield rotational viscosity (RV) checked at 2.088. This example of the invention clearly shows that despite the short 1-hour curing time, the composition met requirements and also exceeded them, increasing with the increase of polymer content.

Example 6: P50617D (Invention)

The composition of Example 6 is prepared using the exact formula used to prepare that in Example 5 with the exception that we extended the curing period at 350° F. to 48 hours. Despite only being ⅓ of the 144 hours required to cure when the dialkyl pentasulfide is not present in the composition, the composition not only meets specification requirements but far exceeds them. Dynamic Shear Rheometer (DSR) results were measured at 5.68 KPa at 48 hours versus the 1.30 KPa after only 1 hour, an increase of 4.37 times. Trugrade jumped from 84.9 to 102.5° C. and Brookfield Rotational Viscosity (RV) jumped to 5.625 from 2.088 Pa-s. These higher measurements of physical properties allow for reductions in polymer content which in addition to the faster cure times, lowers overall cost of the formulation resulting in the more Efficient Asphalt Compositions described as the Invention.

Example 7: P50617-E (Invention)

Example 7 relates to the compositions and process as described in Comparative Examples 1 and 2 with the exception that the polymer modifier D243 is replaced by an SBS modifier sold by LCY Elastomers under the trade name Solprene 3520. The polymer is added at 4.5 parts, asphalt at 95.33 parts and the dialkyl pentasulfide at 0.17 parts wt. After only 1-hour cure, Dynamic Shear Rheometer results indicated a G*/sin δ of 1.28 KPa, Truegrade of 84.7 C, and a Brookfield rotational viscosity of 1.9 Pa-s, nearly equivalent to the comparisons prepared without the dialkyl pentasulfide and a 144-hour cure. This again clearly demonstrates the enhanced speed of the cure times as well as the higher efficiencies of the polymer modifications which in turn lead to reduced polymer levels and lower cost.

Example 8: P50617-E (Invention)

Example 8 provides for the utilization of the composition described in Example 7 but with the incorporation of a 24-hour cure time. Dynamic Shear Rheometer (DSR) results were found to be 1.54 KPa, Trugrade measured 86.0° C., MSCR at 76° C. at 1.15 and % recovery of 25.8. Brookfield Rotational viscosity was measured at 2.325 Pa-s. All of the results measured after the 24-hour cure time clearly exceeded specification requirements and also surpassed the results of the comparative of Example 1 after only ⅙ the curing time. Again, proving the efficiency provided to the compositions and process from the incorporation of the dialkyl pentasulfide.

Example 9: P50617-E (Invention)

Example 9 includes the composition prepared following the guidelines contained in Example 8 with the exception that the dialkyl pentasulfide content is increased from 0.32 parts from 0.17 parts. After exposing the blend to the same 24 hours curing period, properties from the additional dialkyl pentasulfide has improved the overall efficiency of the polymer addition, resulting in an increase of DSR value to 1.77 from 1.54 KPa, Truegrade increase from 86.0 to 88.3, MSCR from 1.15 to 0.95 and % recovery to 35.94 from 25.8. Brookfield viscosity increased to 2.475 from 2.325. All properties having increased will allow polymer contents to be reduced, overall improving the efficiency of the polymer modified composition.

Example 10: P46717-A (Comparative)

The comparative composition and process of Example 10 comprises the addition of 93.9 parts of a PG67-22 asphalt into a heated container equipped with a Silverson high shear mixing device. Agitation is started upon the introduction of the asphalt which is then heated to approximately 375° F. Slowly added under agitation is 6.0 parts of a modified SBS polymer, commercially sold as Kraton D1192. The modified polymer is pre-wet into the asphalt under agitation at a temperature of approximately 375° F. for a period of 45 minutes. Circulation is initiated through the Silverson high shear mixer and continued until SBS polymer is completely melted and dispersed, becoming smooth and uniformly distributed into the asphalt phase. To the dispersed polymer asphalt blend is introduced 0.1 parts by weight of elemental sulfur and mixing continued until uniformly dispersed. The resulting blend is then transferred into a separate storage container and placed in a controlled temperature oven equipped with continuous mixing and held under mild agitation for 24 hours at 350° F. for curing. After the 24 hour mixing and cure time, the material was sampled and tested for conformance to Performance Graded asphalt specifications and found to have an original binder DSR (dynamic shear rheometer testing) $G^*/\sin \delta$ result of 1.69 KPa at 76° C. measuring as a true grade of 93.3° C. Use of sulfur as a vulcanization agent does not provide the efficiency improvements imparted by use of the current invention. Asphalt polymer blends take 24-36 hours to fully cure and develop properties and at times may still not meet the requirements of the specifications, requiring higher levels of polymer addition and costs to reach specification compliance.

Example 11: P46717-D (Invention)

The composition and process of Example 11 comprises the addition of 96.685 parts of a PG67-22 asphalt into a heated container equipped with a Silverson high shear mixing device. Agitation is started with the introduction of the asphalt to the heated vessel and the asphalt is heated to approximately 375° F. Slowly added under agitation is 3.0 parts of a modified SBS polymer, commercially sold as Kraton D1192. The modified polymer is pre-wet into the asphalt under agitation at a temperature of approximately 375° F. for a period of 45 minutes. Circulation of the asphalt polymer blend is initiated through the Silverson high shear mixer and continued until SBS polymer is completely melted and dispersed, said mixture becoming smooth and the polymer uniformly distributed into the asphalt phase. To the dispersed polymer asphalt blend is introduced 0.0.315 parts by weight of a dialkyl pentasulfide and mixing continued until uniformly dispersed. The resulting blend is then transferred to a separate storage container and placed in a controlled temperature mixing oven. The oven and container are equipped with continuous mixing and the contents are held under mild agitation for 3 hours at 350° F. for curing. After the 3 hour mixing and cure time, the material was sampled and tested for conformance to Performance Graded asphalt specifications and found to have an original binder DSR (dynamic shear rheometer testing) $G^*/\sin \delta$ result of 1.53 KPa at 76° C. and a true grading of 81.2° C. Asphalt polymer blends using the D1192 polymer with the dialkyl pentasulfides of Example 11 take 1-3 hours to fully cure and develop properties. These high efficiency modified asphalt compositions meet the specification requirements with fast cure times. The shorter processing and cure times of the invention frees up equipment for additional batches making the processing more efficient. The efficient modified asphalt compositions of Example 11 demonstrate use of the present invention technology in a different asphalt base (PG67-22) and a different rate of addition for the dialkyl pentasulfide to produce modified asphalts with fast curing times and lower polymer demand, thereby reducing overall costs.

Example 12: P46717-B (Invention)

Example 12 demonstrates the present invention with the same PG67-22 base asphalt employed in example 11, but with a different linear SBS polymer commercially available from LCY Elastomers as Solprene 3501. It also demonstrates use of a lower polymer content, 2.7 parts and lower dialkyl pentasulfide use at 0.300 parts in 97.0 parts of the PG67-22 asphalt. Cure times of 3 hours produced DSR results of 1.22 KPa at 76° C. and a true grade of 78.2, all within the acceptable ranges of the PG modified asphalt specification guidelines.

Example 13: P46717-C (Invention)

Example 13 illustrates the use of the same embodiments and rates employed in Example 12 above but allows for a curing time of 24 hours versus the 3-hour cure of Example 12. Dynamic Shear Rheometer (DSR) results increased to 1.91 from 1.22 of Example 12. Trugrade jumped to 82.8 from 78.2° C. Longer cure times when using the present invention results in higher efficiency and lower costs while still being able to achieve meeting specification requirements at shorter cure rates.

Example 14: P47217 (Comparative)

The composition and process of Example 14 comprises the addition of 97.1 parts of a PG67-22 asphalt into a heated container equipped with a Silverson high-shear mixing device. Agitation is started with the introduction of the asphalt to the heated vessel and the asphalt is heated to approximately 375° F. Slowly added under agitation is 2.75 parts of a linear SBS polymer, commercially sold as LCY Elastomers Solprene 3501. The modified polymer is pre-wet into the asphalt under agitation at a temperature of approximately 375° F. for a period of 45 minutes. Circulation of the asphalt polymer blend is initiated through the Silverson high shear mixer and continued until SBS polymer is completely melted and dispersed, said mixture becoming smooth and the polymer uniformly distributed into the asphalt phase. To the dispersed polymer asphalt blend is introduced 0.15 parts by weight of BGA, a commercially available crosslinking dispersion additive, available from Ergon Asphalt and Emulsions, and mixing continued until uniformly dispersed. The resulting blend is then transferred to a separate storage container and placed in a controlled temperature mixing oven. The oven and container are equipped with continuous mixing and the contents are held under mild agitation for 36 hours at 350° F. for curing. After the 36 hour mixing and cure time, the material was sampled and tested for conformance to Performance Graded asphalt specifications and found to have an original binder DSR (dynamic shear rheometer testing) $G^*/\sin \delta$ result of 1.60 KPa at 76° C. and a true grading of 81.2° C. MSCR at 76° C. was found to be 0.32 and the % recovery was measured to be 44.78. Asphalt polymer blends using the 3501 polymer with the dialkyl pentasulfides of Example 11 take as little as 1-3 hours to fully cure and develop properties. These high efficiency modified asphalt compositions meet the specification requirements with fast cure times. The shorter processing and cure times of the invention frees up equipment for additional batches making the processing more efficient.

Example 15: P41016 (Comparative)

The composition and process of Example 15 comprises the addition of 93.0 parts of a PG52-28 asphalt into a heated container equipped with a Silverson high shear mixing device. Agitation is started with the introduction of the asphalt to the heated vessel and the asphalt is heated to approximately 375° F. Slowly added under agitation is 5.0 parts of a modified SBS polymer, commercially sold as Kraton D1192. The modified polymer is pre-wet into the asphalt under agitation at a temperature of approximately 375° F. for a period of 45 minutes. Circulation of the asphalt polymer blend is initiated through the Silverson high shear mixer and continued until SBS polymer is completely melted and dispersed, said mixture becoming smooth and the polymer uniformly distributed into the asphalt phase. To the dispersed polymer asphalt blend is introduced 2.0 parts by weight of a sulfur slurry of sulfur flour in mineral oil, said slurry having a sulfur content of 61 parts sulfur and 39 parts mineral oil and mixing continued until uniformly dispersed. The resulting blend is then transferred to a separate storage container and placed in a controlled temperature mixing oven. The oven and container are equipped with continuous mixing and the contents are held under mild agitation for 24 hours at 350° F. for curing. After the 24-hour mixing and cure time, the material was sampled and tested for conformance to Performance Graded asphalt specifications and found to have an original binder DSR (dynamic shear rheometer testing) G*/sin δ result of 1.56 KPa at 76° C. Sulfur slurries such as AAXL-II employed in Example 15 have numerous problems inherent in their utilization. In addition to the longer cure times, the making the slurry requires adding sulfur flour to mineral oil and mixing under high shear using a Cowles type mixer. The slurry is then injected into an asphalt carrier which is then added to the modified asphalt cement. Agitation must be maintained on the sulfur slurry as it quickly settles out once agitation is removed. This results in inconsistent injection rates of sulfur, plugging of lines, and localized over-vulcanization of the modified asphalt. This dumping and high shear dispersion of the sulfur in oil creates clouds of sulfur dust, which present explosion hazards as well as inhalation hazards and a danger to absorption on employee's skin adversely affecting health.

Example 16: P41016 (Comparative)

Example 16 is a comparative example with similar embodiments to those described in Example 15, with the exception that the asphalt base is a PG67-22. The composition and process of Example 16 comprises the addition of 94.4 parts of a PG67-22 asphalt into a heated container equipped with a Silverson high shear mixing device. Agitation is started with the introduction of the asphalt to the heated vessel and the asphalt is heated to approximately 375° F. Slowly added under agitation is 5.0 parts of a modified SBS polymer, commercially sold as Kraton D1192. The modified polymer is pre-wet into the asphalt under agitation at a temperature of approximately 375° F. for a period of 45 minutes. Circulation of the asphalt polymer blend is initiated through the Silverson high shear mixer and continued until SBS polymer is completely melted and dispersed, said mixture becoming smooth and the polymer uniformly distributed into the asphalt phase. To the dispersed polymer asphalt blend is introduced 0.1 parts by weight of AAXL-II, a sulfur slurry of sulfur flour in mineral oil, said slurry having a sulfur content of 61 parts sulfur and 39 parts mineral oil and mixing continued until uniformly dispersed. The resulting blend is then transferred to a separate storage container and placed in a controlled temperature mixing oven. The oven and container are equipped with continuous mixing and the contents are held under mild agitation for 24 hours at 350° F. for curing. After the 24 hour mixing and cure time, the material was sampled and tested for conformance to Performance Graded asphalt specifications and found to have an original binder DSR (dynamic shear rheometer testing) G*/sin δ result of 3.00 KPa at 76° C. MSCR results measured 0.36 with % recovery of 68.4% and a Brookfield rotational viscosity of 2.45 obtained. Sulfur slurries such as AAXL-II employed in Example 16 have numerous problems inherent in their utilization. In addition to the longer cure times, the making the slurry requires adding sulfur flour to mineral oil and mixing under high shear using a Cowles type mixer. The slurry is then injected into an asphalt carrier, which is then added to the modified asphalt cement. Agitation must be maintained on the sulfur slurry as it quickly settles out once agitation is removed. This results in inconsistent injection rates of sulfur, plugging of lines, and localized over vulcanization of the modified asphalt. This dumping and high shear dispersion of the sulfur in oil creates clouds of sulfur dust, which present explosion hazards as well as inhalation hazards and a danger to absorption on employee's skin adversely affecting health.

Example 17: P20190128-A (Invention)

The composition and process of Example 17 comprises the addition of 95.18 parts of a PG70-22 asphalt into a heated container equipped with a Silverson high shear mixing device. Agitation is started with the introduction of the asphalt to the heated vessel and the asphalt is heated to approximately 375° F. Slowly added under agitation is 4.5 parts of a 50/50 combination of a modified SBS polymer, commercially sold as Kraton D1192 and a linear SBS polymer commercially sold as Dexco 2518LDA. The polymer combination is pre-wet into the asphalt under agitation at a temperature of approximately 375° F. for a period of 45 minutes. Circulation of the asphalt polymer blend is initiated through the Silverson high shear mixer and continued until SBS polymer is completely melted and dispersed, said mixture becoming smooth and the polymer uniformly distributed into the asphalt phase. To the dispersed polymer asphalt blend is introduced 0.32 parts by weight of a dialkyl pentasulfide designated as AAXL-IV. The resulting blend is then transferred to a separate storage container and placed in a controlled temperature mixing oven. The oven and container are equipped with continuous mixing and the contents are held under mild agitation for 28 hours at 350° F. for curing. After the 28-hour mixing and cure time, the material was sampled and tested for conformance to Performance Graded asphalt specifications and found to have an original binder DSR (dynamic shear rheometer testing) G*/sin δ result of 3.13 KPa at 88° C. and a true grade of 101.6. Example 17 is illustrative of the ability of the dialkyl pentasulfide to react and produce Efficient polymer modified asphalt compositions when used with combinations of SBS type polymers, Example 17 in particular containing a vinyl modified SBS and a linear SBS polymer.

Example 18: P20190128-B (Comparative)

The composition and process of Comparative Example 18 comprises the addition of 95.34 parts of a PG70-22 asphalt into a heated container equipped with a Silverson high shear mixing device. Agitation is started with the introduction of the asphalt to the heated vessel and the asphalt is heated to approximately 375° F. Slowly added under agitation is 4.5 parts of a 50/50 combination of a modified SBS polymer, commercially sold as Kraton D1192 and a linear SBS polymer commercially sold as Dexco 2518LDA. The polymer combination is pre-wet into the asphalt under agitation at a temperature of approximately 375° F. for a period of 45 minutes. Circulation of the asphalt polymer blend is initiated through the Silverson high shear mixer and continued until SBS polymer is completely melted and dispersed, said mixture becoming smooth and the polymer uniformly distributed into the asphalt phase. To the dispersed polymer asphalt blend is introduced 0.16 parts by weight of a sulfur slurry accelerator combination marketed by Ergon Armor as BGA. The resulting blend is then transferred to a separate storage container and placed in a controlled temperature mixing oven. The oven and container are equipped with continuous mixing and the contents are held under mild agitation for 45 hours at 350° F. for curing. After the 45 hour mixing and cure time, the material was sampled and tested for conformance to Performance Graded asphalt specifications and found to have an original binder DSR (dynamic shear rheometer testing) G*/sin δ result of 3.21 KPa at 88° C. but a Trugrade of only 101.8, results similar to that of Example 17 but requiring nearly 2× longer to react. The dialkyl pentasulfide employed in example 17 of the invention clearly provides more efficient polymer modified asphalt compositions when used in similar polymer blends of Example 18 but with the BGA additive in substitution for the dialkyl pentasulfide even after nearly 2× the reaction time.

Example 19: P53018-A (Invention)

Into a heated container equipped with a Silverson high shear mixing device is charged 96.18 parts of a PG70-22 asphalt cement and agitation started and heated to 375° F. Slowly added is 3.5 parts of a linear SBS copolymer commercially sold as Kraton D1101 and allowed to pre-wet at a temperature of 375° F. for a period of 45 minutes. Circulation is initiated through the Silverson high shear mixer until SBS polymer is completely melted and dispersed during the 45-minute period, becoming smooth and uniformly distributed into the asphalt phase. To this mixture is added 0.32 parts of the dialkyl pentasulfide of the invention. The dispersed polymer heat activated dialkyl pentasulfide blend is then transferred into a separate storage container and placed in a controlled temperature oven equipped with continuous mixing and held under mild agitation at 350° F. for curing. Full curing took only 4 hours to meet specification requirements. Material was sampled and tested for conformance to Performance Graded asphalt specifications and found to have an original binder DSR(dynamic shear rheometer testing) G*/sinδ result of 3.13 KPa at 76° C. MSCR results at 76° C. was 0.04 with a recovery of 83.53%. Brookfield rotational viscosity measured at 135° C. was found to be 6.825 PA-s. The highly efficient polymer modified asphalt composition produced according to Example 19 cured in as little as 4 hours and gave results for a 3.5% polymer loading that could be greatly reduced and still meet specification requirements for PG76-22 at significantly lower costs. The dialkyl pentasulfide was found to greatly speed reaction times compared to sulfur, sulfur accelerator compositions, or other pentasulfides such as phosphorus pentasulfide which had inherent problems in handling and its explosive nature and instability upon prolonged storage.

Example 20: 20190703 (Invention)

Example 20 relates to the compositions prepared according to the invention but whereas the asphalt and polymer dispersion is first prepared in a higher concentrated form ranging from 8-20% concentration of SBS polymer dispersed in a portion of the total required asphalt of the composition. The composition and process of manufacture comprises the addition of 71.74 parts of a PG67-22 asphalt into a heated container equipped with a Silverson high shear mixing device. Agitation is started with the introduction of the asphalt to the heated vessel and the asphalt is heated to approximately 375° F. Slowly added under agitation is 17.94 parts of a linear SBS polymer, commercially sold as Kraton D1101 or a combination of modified SBS polymers, radial SB Polymers or linear SBS polymers commercially available and well known to those skilled in the art. The polymer is pre-wet into the asphalt under agitation at a temperature of approximately 375° F. for a period of 45 minutes. Circulation of the concentrated asphalt polymer blend is initiated through the Silverson high shear mixer and continued until all the SBS polymer is completely melted and dispersed, said mixture becoming smooth and the polymer uniformly distributed into the asphalt phase. To the dispersed polymer asphalt blend is introduced 0.32 parts by weight of a dialkyl pentasulfide designated as AAXL-IV and the remaining PG67-22 asphalt necessary to prepare final blends containing from about 2.0 to about 10% polymer asphalt blend. The resulting blend is then transferred to a separate storage container and placed in a controlled temperature mixing oven. The oven and container are equipped with continuous mixing and the contents are held under mild agitation for 4-24 hours at 350° F. for curing. After the 4-24 hours mixing and cure time, the material was sampled and tested for conformance to Performance Graded asphalt specifications and adjusted accordingly in concentration to either meet requirements for a concentrated mother liquid which can be transported and diluted at other facility storage as needed for use or to meet final Performance Graded Asphalt or industrial asphalt application specifications. Example 20 is meant to be illustrative of the ability to produce concentrated versions of the Efficient Modified Asphalt Compositions of the Invention which can be transported to final destinations as necessary and then readily diluted to meet individual specification requirements.

Examples Summary

A summary of the examples and the results are provided in Tables 2-6.

TABLE 2

Summary of a first set of the examples.

EXAMPLES

| | Sample ID | | | | |
|---|---|---|---|---|---|
| | P50617-A | P50617-B | P50617-C | P50617-C | P50617-D |
| Invention/Comparative | Comparative | Comparative | Invention | Invention | Invention |
| Polymer | D243 | D243 | D243 | D243 | D243 |
| Parts Polymer | 4.5 | 5 | 4.5 | 4.5 | 5 |
| Asphalt Source-Grade | PBF 70-22 | PBF 70-22 | PBF 70-23 | PBF 70-24 | PBF 70-25 |
| Parts Asphalt | 95.5 | 95 | 95.41 | 95.41 | 94.91 |
| Parts GTR | 0 | 0 | 0 | 0 | 0 |
| Parts Sasobit-Wax | 0 | 0 | 0 | 0 | 0 |
| Parts Sulfur | 0 | 0 | 0 | 0 | 0 |
| Parts BGA Crosslinker | 0 | 0 | 0 | 0 | 0 |
| Parts AAXL-II | 0 | 0 | 0 | 0 | 0 |
| Parts AAXL-IV | 0 | 0 | 0.09 | 0.09 | 0.09 |
| Total: | 100 | 100 | 100 | 100 | 100 |
| RESULTS: | | | | | |
| Cure Time Hours | 144 | 144 | 1 | 48 | 1 |
| ODSR 76C | — | — | — | — | — |
| ODSR 82C | 1.56 | 2.16 | 1.09 | 4.77 | 1.3 |
| ODSR 88C | — | — | — | — | — |
| Trugrade | 86.6 | 82.0 | 93.0 | 100.1 | 84.9 |
| MSCR 76C | 0.92 | 0.51 | — | 0.06 | — |
| % Recovery | 24.75 | 52.7 | — | 83.26 | — |
| RV@ 135C | 1.938 | 2.82 | 1.825 | 4.563 | 2.088 |

TABLE 3

Summary of a second set of the examples.

EXAMPLES

| | Sample ID | | | | |
|---|---|---|---|---|---|
| | P50617-D | P50617-E | P50617-E | P50617-E | P46717-A |
| Invention/Comparative | Invention | Invention | Invention | Invention | Comparative |
| Polymer | D243 | LCY 3520 | LCY 3520 | LCY 3520 | D1192 |
| Parts Polymer | 5 | 4.5 | 4.5 | 4.5 | 6 |
| Asphalt Source-Grade | PBF 70-26 | PBF 70-27 | PBF 70-28 | PBF 70-29 | Preferred PG67-22 |
| Parts Asphalt | 94.91 | 95.33 | 95.33 | 95.18 | 93.9 |
| Parts GTR | 0 | 0 | 0 | 0 | 0 |
| Parts Sasobit-Wax | 0 | 0 | 0 | 0 | 0 |
| Parts Sulfur | 0 | 0 | 0 | 0 | 0.1 |
| Parts BGA Crosslinker | 0 | 0 | 0 | 0 | 0 |
| Parts AAXL-II | 0 | 0 | 0 | 0 | 0 |
| Parts AAXL-IV | 0.09 | 0.17 | 0.17 | 0.32 | 0 |
| Total: | 100 | 100 | 100 | 100 | 100 |
| RESULTS: | | | | | |
| Cure Time Hours | 48 | 1 | 24 | 24 | 24 |
| ODSR 76C | — | — | — | — | 1.69 |
| ODSR 82C | 5.68 | 1.28 | 1.54 | 1.77 | — |
| ODSR 88C | — | — | — | — | — |
| Trugrade | 102.5 | 84.7 | 86.0 | 88.3 | 93.3 |
| MSCR 76C | 0.05 | — | 1.15 | 0.95 | — |
| % Recovery | 85.87 | — | 25.8 | 35.94 | — |
| RV@ 135C | 5.625 | 1.9 | 2.325 | 2.475 | — |

TABLE 4

Summary of a third set of the examples.
EXAMPLES

| | Sample ID | | |
|---|---|---|---|
| | P46717-D | P46717-B | P46717-C |
| Invention/Comparative | Invention | Invention | Invention |
| Polymer | D1192 | LCY 3501 | LCY3501 |
| Parts Polymer | 3 | 2.7 | 2.7 |
| Asphalt Source-Grade | Marathon 67-22 | Marathon 67-22 | Marathon 67-22 |
| Parts Asphalt | 96.685 | 97 | 97 |
| Parts GTR | 0 | 0 | 0 |
| Parts Sasobit-Wax | 0 | 0 | 0 |
| Parts Sulfur | 0 | 0 | 0 |
| Parts BGA Crosslinker | 0 | 0 | 0 |
| Parts AAXL-II | 0 | 0 | 0 |
| Parts AAXL-IV | 0.315 | 0.300 | 0.300 |
| Total: | 100 | 100 | 100 |
| RESULTS: | | | |
| Cure Time Hours | 3 | 3 | 24 |
| ODSR 76C | 1.53 | 1.22 | 1.91 |
| ODSR 82C | — | — | — |
| ODSR 88C | — | — | — |
| Trugrade | 81.2 | 78.2 | 82.8 |
| MSCR 76C | — | — | — |
| % Recovery | — | — | — |
| RV@ 135C | — | — | — |

TABLE 5

Summary of a fourth set of the examples.
EXAMPLES

| | Sample ID | | |
|---|---|---|---|
| | P47217 | P41016 | P41016 |
| Invention/Comparative | Comparative | Comparative | Comparative |
| Polymer | LCY 3501 | D1192 | D1192 |
| Parts Polymer | 2.75 | 5 | 5 |
| Asphalt Source-Grade | Marathon 67-22 | Marathon 52-28 | Marathon 67-22 |
| Parts Asphalt | 97.1 | 93 | 94.4 |
| Parts GTR | 0 | 0 | 0 |
| Parts Sasobit-Wax | 0 | 0 | 0.5 |
| Parts Sulfur | 0 | 0 | 0 |
| Parts BGA Crosslinker | 0.15 | 0 | 0 |
| Parts AAXL-II | 0 | 2 | 0.1 |
| Parts AAXL-IV | 0 | 0 | 0 |
| Total: | 100 | 100 | 100 |
| RESULTS: | | | |
| Cure Time Hours | 36 | 24 | 24 |
| ODSR 76C | 1.6 | 1.56 | 3.0 |
| ODSR 82C | — | — | — |
| ODSR 88C | — | — | — |
| Trugrade | — | — | — |
| MSCR 76C | 0.32 | 0.3 | 0.36 |
| % Recovery | 44.78 | 87.05 | 68.4 |
| RV@ 135C | — | — | 2.45 |

TABLE 6

Summary of a fifth set of the examples.
EXAMPLES

| | Sample ID | | |
|---|---|---|---|
| | PB20190128-A | PB20190128-B | P53018-A |
| Invention/Comparative | Invention | Comparative | Invention |
| Polymer | D1192/2518 | D1192/2518 | D1101 |
| Parts Polymer | 4.5 | 4.5 | 3.5 |
| Asphalt Source-Grade | PBF70-22 | PBF70-22 | PBF70-22 |
| Parts Asphalt | 95.18 | 95.34 | 96.18 |
| Parts GTR | 0 | 0 | 0 |
| Parts Sasobit-Wax | 0 | 0 | 0 |
| Parts Sulfur | 0 | 0 | 0 |
| Parts BGA Crosslinker | 0 | 0.16 | 0 |
| Parts AAXL-II | 0 | 0 | 0 |
| Parts AAXL-IV | 0.32 | 0 | 0.32 |
| Total: | 100 | 100 | 100 |
| RESULTS: | | | |
| Cure Time Hours | 28 | 45 | 4 |
| ODSR 76C | — | — | 3.13 |
| ODSR 82C | — | — | — |
| ODSR 88C | 3.13 | 3.21 | — |
| Trugrade | 101.6 | 101.8 | — |
| MSCR 76C | — | — | 0.04 |
| % Recovery | — | — | 83.53 |
| RV@ 135C | — | — | 6.825 |

What is claimed is:

1. A modified asphalt composition comprising:
   asphalt;
   a crosslinkable polymer; and
   a dialkyl polysulfide, wherein the dialkyl polysulfide comprises a dialkyl octasulfide.

2. The composition of claim 1, wherein the asphalt is included in the modified asphalt composition in an amount of about 5-85 wt. % of the modified asphalt composition.

3. The composition of claim 1, wherein the crosslinkable polymer comprises an alkene monomer.

4. The composition of claim 3, wherein the alkene monomer comprises at least two alkene groups.

5. The composition of claim 1, wherein the crosslinkable polymer comprises a styrene monomer.

6. The composition of claim 1, wherein the crosslinkable polymer comprises an alkene monomer and a styrene monomer.

7. The composition of claim 1, wherein the crosslinkable polymer is included in the modified asphalt composition in an amount of about 0.5-20 wt. % of the asphalt.

8. The composition of claim 1, wherein the dialkyl polysulfide is included in the modified asphalt composition in an amount of about 0.01-2.0 wt. % of the modified asphalt composition.

9. The composition of claim 1, wherein the dialkyl polysulfide is an additive that is not originally present in the asphalt itself.

10. The composition of claim 1, wherein:
   the asphalt is included in the modified asphalt composition in an amount of about 5-85 wt. % of the modified asphalt composition;
   the crosslinkable polymer is included in the modified asphalt composition in an amount of about 0.5-20 wt. % of the asphalt;
   the dialkyl polysulfide is included in the modified asphalt composition in an amount of about 0.01-2.0 wt. % of the modified asphalt composition; and the dialkyl polysulfide is an additive that is not originally present in the asphalt itself.

11. The composition of claim 10, wherein the crosslinkable polymer comprises an alkene monomer.

12. The composition of claim 11, wherein the crosslinkable polymer further comprises a styrene monomer.

13. The composition of claim 1, wherein the composition further comprises a fluxing agent.

14. The composition of claim 13, wherein the composition comprises the fluxing agent in an amount of about 0-80 wt. % of the modified asphalt composition.

15. A method of making a modified asphalt composition as recited in claim 1, the method comprising blending a mixture of asphalt, a crosslinkable polymer, and a dialkyl polysulfide.

16. The method of claim 15, wherein the mixture is blended at a temperature of about 100-300° C.

17. The method of claim 15, wherein:
the asphalt is included in the modified asphalt composition in an amount of about 5-85 wt. % of the modified asphalt composition;
the crosslinkable polymer is included in the modified asphalt composition in an amount of about 0.5-20 wt. % of the asphalt;
the dialkyl polysulfide is included in the modified asphalt composition in an amount of about 0.01-2.0 wt. % of the modified asphalt composition;
the dialkyl polysulfide is an additive that is not originally present in the asphalt itself; and
the blending comprises adding the dialkyl polysulfide in a solution form to a pre-mixture of the asphalt and the crosslinkable polymer.

18. The method of claim 15, wherein the blending comprises adding the dialkyl polysulfide in a solution form to a pre-mixture of the asphalt and the crosslinkable polymer.

19. The method of claim 15, wherein:
the crosslinkable polymer comprises an alkene monomer; and
the crosslinkable polymer further comprises a styrene monomer.

* * * * *